Patented Apr. 8, 1924.

1,489,388

UNITED STATES PATENT OFFICE.

RACHEL J. GLENN, OF ANDERSON, SOUTH CAROLINA.

HAIR COMPOUND.

No Drawing.   Application filed October 16, 1918.  Serial No. 258,412.

*To all whom it may concern:*

Be it known that I, RACHEL J. GLENN, a citizen of the United States, residing at Anderson, in the county of Anderson and State of South Carolina, have invented certain new and useful Improvements in Hair Compounds; and I do hereby declare the following to be a full, clear, and exact description of the invention, such as will enable others skilled in the art to which it appertains to make and use the same.

This invention has reference to a compound for promoting the growth of hair and for imparting to it a smooth and fluffy finish, and it is also an object of the invention to straighten kinky hair and to produce a growth of straight and smooth hair with persons having otherwise kinky hair; and it is a further object of the invention to cause existing hair to grow to a very considerable length by the application of the compound in accordance with my invention.

In carrying out my invention I make use of an inorganic fat such as petroleum-jelly largely in excess, and incorporate therein a mixture of powdered orris-root, quinine, preferably in form of the muriate (hydrochloride) and powdered sulphur, these additions acting both as powerful medicinal agents, and as a means of imparting more body and consistence to the excess of fatty material. A small addition of alcohol increases the smoothness of the product, and assists in obtaining a thorough and intimate mixture of the ingredients, and it also has qualities of its own for promoting pilar growth.

In its broad aspect the invention comprises an intimate mixture of the ingredients above mentioned with an addition of some scenting or flavoring compound, such as rose of geranium or other perfume. The powdered ingredients, the orris root, the quinine and the sulphur are intimately mixed by being sifted three or four times together, until all of the lumps are reduced to powder, and an intimate uniform mixture is obtained. Then pour on a marble or glass slab or into a mortar, melt the petroleum jelly thoroughly, and pour the molten material into or onto the mixture of powdered materials, work well with some kind of an agitator, a pestle or a spatula, until all of the fatty material is well mixed in, and a smooth ointment-like mass is obtained; then add the alcohol and mix it well with the ointment-like mass, and add the perfume and mix.

In carrying out my invention I may use the following proportions and kinds of material though I wish it to be understood that my invention is capable of various modifications in the proportioning and the selection of the ingredients within the scope of the claim as hereunto appended and without deviating from the spirit of my invention, and it is also to be understood that the manner of mixing and incorporating the various ingredients may likewise be modified.

As an instance of proportions and kinds of material I have found to give very satisfactory result I may mention the following, and the way of procedure in mixing the same. Take of powdered orris-root one-and-one-half ounce, of powdered quinine-muriate one quarter of an ounce; mix and add five grains of sulphur flour or flowers; mix well together. Melt in a separate vessel one pound of white petroleum-jelly-vaseline, and pour the petroleum-jelly into the mixture of powdered material, and mix until very soft and smooth; then flavor with twelve drops of oil of rose of geranium; then add fifteen drops of alcohol.

The preparation according to my invention has been found to prevent the falling-out of the hair, and to produce a very exuberant growth not only with soft Caucasian, but also with kinky and stubborn hair, and it has been found to lengthen the hair and to promote its growth to such an extent that hair of about four inches has been grown in some instances to a length of about twenty inches.

What I claim is:—

1. A composition of matter suitable for use as a hair tonic, comprising petrolatum in large excess, a moderate amount of powdered orris root and smaller amounts of quinine hydrochloride, alcohol and sulfur.

2. A composition of matter suitable for use as a hair tonic, comprising the following ingredients in about the proportions stated, namely:

| | |
|---|---|
| White petrolatum | 1 pound, |
| Powdered orris root | 1½ ounces, |
| Powdered quinine hydrochlorid | ¼ ounce, |
| Flowers of sulfur | 5 grains, |
| Alcohol | 15 drops, | such ingredients being thoroughly mixed together to form an ointment-like, smooth mass.

In testimony whereof I affix my signature in presence of two witnesses.

RACHEL J. GLENN.

Witnesses:
 RUBY DAVENPORT,
 G. H. GEIGER.